United States Patent Office 3,493,390
Patented Feb. 3, 1970

3,493,390
POTATO CHIP PROCESS
John A. Succo, Colerain Township, Hamilton County, Ohio, assignor to The Procter & Gamble Company, Cincinnati, Ohio, a corporation of Ohio
No Drawing. Filed Dec. 20, 1966, Ser. No. 603,136
Int. Cl. A23l 1/12
U.S. Cl. 99—100      2 Claims

ABSTRACT OF THE DISCLOSURE

A formulated potato chip is prepared by admixing comminuted raw potatoes, amylopectin, egg albumen, sugar, and shortening to form a homogeneous dough. The dough is rolled into thin, substantially elliptical or oval wafers which are frozen to facilitate handling. Two or more of the frozen wafers are superposed and baked to provide a crisp, tasty potato chip which has a blistered surface resembling that of conventional chips prepared by frying slices of raw potatoes.

BACKGROUND OF THE INVENTION

This invention relates to a potato chip product and to the process for preparing the same. More particularly, it relates to an improved potato chip product and process in which the particle size of raw potatoes is reduced to prepared a dough which is then shaped and baked to form a crisp, tasty, edible potato chip product which has a cellular structure and a blistered surface resembling that of conventional potato chips prepared by deep fat frying slices of raw potatoes.

The preparation of doughs from which uniform, homogeneous potato chips can be made has been previously disclosed by Markakis et al. in U.S. Patent 3,027,258; by Hilton in U.S. Patent 3,109,739; and by Schaul in U.S. Patent 2,469,995. In each of the above-mentioned patents a dough is prepared which is then rolled or otherwise flattened to provide a thin sheet. The thin sheet is cut into suitable shaped pieces and the latter are fried or baked until they are crisp.

The finished chips made by combining the previously-used ingredients according to the previously-described processes are crisp but lack the blistered appearance of conventional potato chips prepared by deep fat frying thin slices of raw potatoes. The blistered appearance is desirable in the chips prepared from a dough because the finished chips more closely resemble conventionally prepared chips and the consuming public is accustomed to chips having a blistered appearance. Furthermore, blistered chips are more tender and less cracker-like in texture than unblistered chips and are thus preferred on the basis of their eating quality.

SUMMARY OF THE INVENTION

Briefly stated, the present invention comprises the preparation of a dough from comminuted raw potatoes, which dough is formed into thin, flat wafers having a substantially uniform thickness of from about 0.01 inch to about 0.03 inch. At least two of the wafers are superposed to form a single, multilayered wafer which is baked at a temperature of from about 325° F. to about 450° F. for from about 5 minutes to about 16 minutes to form a crisp, tasty, edible potato chip having a blistered surface resembling that generally found on conventional potato chips prepared by deep fat frying slices of raw potatoes.

DESCRIPTION OF THE PREFERRED EMBODIMENTS

A potato chip of the character contemplated by the which are suitable for the preparation of potato chips present invention can be prepared from potato varieties and which provide the preferred potato chip taste. While the Kennebec variety is preferred, Russet Burbank, Idaho Russet, and Sebago potatoes are among other varieties which can be employed in the present invention to provide chips having a good flavor.

The potatoes are peeled and diced to form substantially cubical pieces which can range from about ¼-inch to about ½-inch in size. The cubes are reduced in particle size by pulverization to provide a potato mash which has only a slightly grainy feel. In the course of reducing the particle size of the raw potatoes it is preferable that the starch granules of the potatoes remain substantially intact so that the dough formed does not become excessively sticky. In addition, if too many starch granules are broken, part of the soluble starch thereby released is lost upon subsequent removal of excess water from the resulting slurry.

Reduction of the particle size of the raw potatoes can be accomplished in any apparatus which will cut or shear the potatoes into fine particles without excessive rupture of the starch granules. The particle size is preferably from about 0.015 inch to about 0.03 inch. Crushing of the potatoes should be avoided since this results in the formation of a stringy pulp and adversely affects the texture of the final product. Good results have been obtained by the use of a Waring Blendor to which is added a quantity of water equal to about half the weight of the potatoes to be pulverized. The quantity of water which is added is not critical but its presence has been found to be necessary to obtain quick, uniform pulverization of the diced potatoes and to provide a smooth mixture of finely divided potato solids and water. The pulverization step is preferably performed within about 15 to 30 seconds to prevent discoloration of the potatoes. Discoloration can be minimized, however, by adding to the diced potato-water mixture small amounts of sulfite, such as sodium bisulfite.

After the particle size of the raw potatoes has been reduced to form a mixture of finely divided potato solids and water, a portion of the water is separated therefrom to provide a mixture having a water content of from about 50% to about 60% by weight. If the water content of the mixture is greater than about 60% by weight the dough which is subsequently formed is difficult to handle in that it is weak and thin in body; if the water content is less than about 50% by weight of the mixture the resulting potato chip product is undesirably dry and has an eating quality which is more cookie- or cracker-like than chip-like. The separation of the excess water from the mixture can be accomplished by means of, for example, a centrifuge, a screw press, or by filtration through a cloth.

The resulting slurry of potato solids and water is intimately intermixed with shortening, sugar, egg albumen, and amylopectin in quantities and in a manner hereinafter described to form a homogeneous dough. Preferably the potato-water slurry comprises from about 25% to about 45% of the dough.

The shortening comprises from about 10% to about 25% of the dough on a weight basis and is preferably a normally plastic triglyceride composition having an iodine value of from about 50 to about 90. A normally plastic triglyceride composition is a fat which is nonpourable at ambient temperatures (about 70 to 100° F.), but which contains sufficient normally liquid oil and low melting solids that the composition is converted to a liquid upon heating. The base oil of such a plastic triglyceride composition generally is a normally triglyceride oil. Uniformly dispersed in the base oil is sufficient high melting, highly hydrogenated triglyceride solids having an iodine index of less than about 12 (commonly referred to as hardstock) to give the composition its plastic consistency.

Generally, the highly hydrogenated triglyceride hardstock comprises from about 5% to about 50% by weight of the total composition. Examples of normally plastic fats which are useful in the compositions disclosed herein are described in U.S. Patent 2,132,394, issued to Coith, Richardson, and Votaw on Oct. 11, 1938, and in U.S. Patent 2,801,177, issued to Lutton on July 30, 1957.

The shortening can contain the usual amounts of emulsifiers and other agents such as, for example, mono- and diglyceride emulsifiers, lactylated glyceride emulsifiers, sorbitan or polyoxyethylene sorbitan esters of fatty acids, esters of polyhydric alcohol, fatty acid derivatives of polycarboxylic acids, free fatty acids, and many other substances commonly used in shortening to improve the cooking or other properties.

The sugar employed in the present invention is preferably a non-reducing sugar such as sucrose, and is employed to replace that quantity of soluble sugar which is present in raw potatoes but which is lost as a result of removing the excess water from the slurry of potato solids and water. If a reducing sugar, such as glucose or maltose, is included in the dough, a smaller quantity of such sugar is used than non-reducing sugar since the reducing sugars combine more readily with the amino acids present in potatoes to provide the desired browning effect. Thus, the addition of the same quantity of reducing sugar as non-reducing sugar will result in an increase in the rate and degree of browning which takes place upon baking the final product. Since it is desired that the color of the final product be a light or pale yellow rather than dark brown in color, the sugar content of the dough should range from about 0.5% to about 5% by weight if a non-reducing sugar is employed and from about 0.25% to about 1% by weight if a reducing sugar is employed.

Protein, such as egg albumen, is added to improve tenderness and crispness of the final product. Suitable proteinaceous materials in addition to egg albumen are, for example, wheat gluten or isolated soy protein. The preferred quantity of protein in the dough is from about 1% to about 5% by weight and the preferred protein is egg albumen.

Amylopectin is included in the dough composition as a binder material to hold the potato particles together. Although amylopectin is available in dry form, the finished potato chip products have a more tender texture when the amylopectin is completely dissolved in water to form a gel which is added to the potato-water mixture. A gel comprising from about 10% to about 50% amylopectin by weight, preferably 20%, can be employed. Preferably, from about 20% to about 60% of a 20% amylopectin gel is used. This contributes from about 2% to about 30% amylopectin and from about 10% to about 54% water to the composition. The amylopectin can be derived from, for example, waxy maize or potatoes.

The ingredients disclosed above can be mixed together by hand to provide a substantially homogeneous dough. Alternatively, the mixing can be performed mechanically by a mixing device. If the latter is used to intermix the ingredients, it is preferred that the mixing be performed at low speed to avoid rupture of the starch granules in the comminuted raw potatoes during the mixing operation and thereby minimize consequent stickness of the dough. Although the ingredients can all be combined in a single vessel and then mixed together, it is preferred that the ingredients in fluid form, i.e., the potato-water slurry and the amylopectin gel, be intimately admixed to a uniform consistency and that the substantially dry ingredients, i.e., the sugar, egg albumen, and shortening, be separately added and intimately blended with the fluid ingredients.

After the dough has been prepared, it is divided into a plurality of smaller pieces approximately half a teaspoon in volume. These pieces are rolled into thin flat wafers of dough. The wafers can range from about 0.01 inch to about 0.03 inch in thickness and can be, for example, circular, oval, or elliptical in shape. The elliptical or oval shapes are preferred, however, since conventional potato chips made by frying slices of raw potatoes have a generally elliptical or oval shape and it is desired that the potato chips of the present invention resemble conventional potato chips as closely as possible.

The resulting wafers of dough are difficult to handle without tearing because the pieces are extremely thin. It has been found that freezing of the wafers greatly simplifies handling in that they thereby become rigid and are less prone to tear. In addition to the handling advantage, freezing of the wafers permits the dough to be prepared and shaped and then stored for extended periods prior to the preparation of the chips.

One of the shortcomings of previously proposed compositions and processes for preparing homogeneous potato chips based on doughs based on comminuted raw potatoes has been the lack of significant blistering in the finished product resembling that blistering found on conventional potato chips prepared by deep fat frying slices of raw potato. This condition has resulted in chips having a smooth, cracker-like appearance which suggests that they are not potato chips. This is an undesirable condition in that the consuming public is accustomed to seeing blisters of various sizes and resulting uneven surfaces on potato chips.

It has been found that the desirable blistering of the chips prepared according to the present invention can be obtained by providing a laminated chip which is prepared by superposing two or more of the frozen wafers to form a single, multi-layer chip. The wafers are placed one upon the other without substantial pressure and the combination is baked. The resulting chip is a single piece and has a blistered surface resembling that of conventional chips made by frying slices of raw potatoes.

While the precise mechanism by which the laminated chip acquires a blistered surface is not known, it is suspected that the air entrapped between the adjacent wafers expands upon heating and thereby serves to form a blister between the wafers. Another possible explanation is that frozen moisture on the surfaces of the frozen wafers forms steam upon heating, with the steam causing the wafers to separate to form surface blisters on the chips.

The baking is preferably performed in two stages to obtain the desired chip texture and surface coloration in a shorter period of time than would be necessary with single stage baking. The chips are first baked for from about 2 minutes to about 5 minutes at a temperature of about 450° F. and then baked for from about 2 minutes to about 6 minutes at a temperature of about 350° F. Alternatively, the baking can be performed in a single baking step at temperatures of from about 325° F. to about 450° F. for from about 5 minutes to about 16 minutes.

The laminated chip can be baked on a flat surface to form a chip which may have only a relatively small degree of surface curvature, caused either by blistering of the surface or by localized warping of the chip during baking. Preferably, however, the chips are baked in such a way that a definite curved shape is imparted to the baked chip to more closely simulate the shape of conventional chips prepared by frying slices of raw potatoes. This curvature can be imparted to the chips of the present invention by baking the chips between a pair of similarly configured, curved forming screens which can be formed from, for example, about an 80 mesh U.S. Standard Screen.

The following example of the invention, while not intended to be taken as limiting the scope thereof, will serve to illustrate the compositions of and the processes for making the potato chips of the present invention. Unless otherwise indicated in the example, all percentages are based on weight.

EXAMPLE

Two hundred grams of raw, peeled Kennebec potatoes were diced to form cubes ranging in size from about ¼ inch to about ½ inch. The cubes were placed in a Model No. 700A Waring Blendor. One hundred grams of cold water was added to the diced potatoes and the mixture was blended for 15 seconds to provide potato particles having an average particle size of about 0.02 inch. The resulting potato-water slurry was then placed onto a wet, fine-weave cloth which was wrapped around the slurry and hand squeezed until 225 grams of water were removed from the slurry to form a potato-water mixture having 50% water. 77 grams of amylopectin gel comprising 20% amylopectin derived from corn and 80% water was intimately admixed by hand with the potato-water mixture to form a homogeneous blend. 33.7 grams of a plastic shortening made from partially hydrogenated cottonseed oil and having an iodine value of 74, 4.8 grams of egg albumen, and 1.9 grams of sucrose were added to the potato-water-amylopectin mixture which was hand stirred for 1 minute to form a uniform dough.

½ teaspoon quantities of the dough were placed between sheets of waxed paper and were rolled into thin, flat wafers having a uniform thickness of 0.02 inch. The wafers were frozen by exposing them to a temperature of 0° F. for one-half hour. Two of the frozen wafers of substantially equal size were removed from the waxed paper and placed in superposed relationship on a curved stainless steel mesh to form a single, two-layered wafer. The resulting wafer was baked for 3 minutes at a temperature of 450° F. and for 4 minutes at a temperature of 350° F. The resulting crisp potato chip had a pleasing potato chip taste and had blistered outer surfaces resembling those of conventional potato chips made by deep fat frying slices of raw potatoes.

In the above example, substantially similar results are obtained in that tasty potato chips having blistered surfaces are produced when:

(a) The quantity of water in the potato-water mixture is within the range of from about 50% to about 60% (e.g., 50%, 55%, and 60%);

(b) The quantity of potato-water mixture of the composition is within the range of from about 25% to about 45% (e.g., 25%, 35%, and 45%);

(c) The quantity of amylopectin in the composition is within the range of from about 2% to about 30% (e.g., 2%, 16%, and 30%) and the corresponding quantity of additional water present because the amylopectin is added as a gel is from about 10% to about 54%;

(d) The quantity of shortening in the composition is within the range of from about 10% to about 25% (e.g., 10%, 17%, and 25%);

(e) The quantity of sugar in the composition is within the range of from about 0.5% to about 5% (e.g., 0.5%, 2.5%, and 5%); and (f) The quantity of egg albumen in the composition is within the range of from about 1% to about 5% (e.g., 1%, 3%, and 5%).

When the amount of water in the potato-water mixture is combined with the amount of water in the amylopectin gel the total quantity of water in the dough ranges from about 22.5% to about 81% and the quantity of comminuted raw potato solids ranges from about 12.5% to about 27.5%.

I claim:

1. A process for preparing crisp, tasty, edible potato chips, said process comprising:
    (a) dicing raw, peeled potatoes to form substantially cubical pieces having edges ranging in size from about ¼ inch to about ½ inch;
    (b) reducing the particle size of said diced potatoes in the presence of water to form a slurry comprising water and granular potato particles ranging in size from about 0.015 inch to about 0.03 inch without substantially rupturing the starch granules present in the potatoes;
    (c) extracting water from said potato-water slurry to form a mixture of potato particles and water having from about 50% to about 60% water;
    (d) intimately admixing amylopectin, egg albumen, sugar, and shortening to form a dough comprising by weight from about 12.5% to about 27.5% comminuted raw potato solids, from about 2% to about 30% amylopectin, from about 22.5% to about 81% water, from about 1% to about 5% egg albumen, from about 0.5% to about 5% sugar, and from about 10% to about 25% shortening;
    (e) forming said dough into thin, flat wafers having a thickness of from about 0.01 inch to about 0.3 inch;
    (f) freezing said thin, flat wafers;
    (g) superposing at least two of said frozen wafers without substantial pressure to form a single, multi-layered wafer; and
    (h) baking said multi-layered wafer at a temperature of about 325° F. to about 450° F. for from about 5 minutes to about 16 minutes.

2. The process of claim 1 including the additional step of placing said multi-layered wafer between a pair of similarly configured curved forming screens prior to baking.

References Cited

UNITED STATES PATENTS

| 3,027,258 | 3/1962 | Markakis et al. | 99—81 |
| 3,109,739 | 11/1963 | Hilton | 99—100 |
| 3,220,852 | 11/1965 | Gerkens et al. | 99—100 |

ALVIN E. TANENHOLTZ, Primary Examiner

W. A. SIMONS, Assistant Examiner